(12) United States Patent
Blumberg et al.

(10) Patent No.: US 7,925,372 B2
(45) Date of Patent: Apr. 12, 2011

(54) NEUTRAL DATA COMPUTER CONTROL SYSTEM FOR A MACHINE TOOL USED TO PRODUCE WORKPIECES WITH A THREADED SURFACE AND ASSOCIATED MACHINE TOOL

(75) Inventors: Manfred Blumberg, Wipperfürth (DE); Stefan Dirrichs, Wermelskirchen (DE); Wolfgang London, Hückeswagen (DE); Gary Töpfer, Remscheid (DE)

(73) Assignee: Trinary Anlagenbau GmbH, Monchengladbach (DE)

( * ) Notice: Subject to any disclaimer, the term of this patent is extended or adjusted under 35 U.S.C. 154(b) by 707 days.

(21) Appl. No.: 10/575,532

(22) PCT Filed: Oct. 17, 2003

(86) PCT No.: PCT/EP03/11568
§ 371 (c)(1),
(2), (4) Date: Apr. 12, 2006

(87) PCT Pub. No.: WO2005/047995
PCT Pub. Date: May 26, 2005

(65) Prior Publication Data
US 2007/0112455 A1  May 17, 2007

(51) Int. Cl.
*G06F 19/00* (2006.01)
(52) U.S. Cl. ............... 700/186; 700/164; 700/182
(58) Field of Classification Search ............ 700/159, 700/164, 180, 182, 186, 187; 318/560, 567, 318/568.1
See application file for complete search history.

(56) References Cited

U.S. PATENT DOCUMENTS

| 4,329,096 | A | * | 5/1982 | Herscovici | ............... 700/160 |
| 4,405,829 | A | | 9/1983 | Rivest et al. | |
| 4,672,549 | A | | 6/1987 | Saxton | |
| 4,761,891 | A | | 8/1988 | Sugimura | |
| 4,981,402 | A | | 1/1991 | Krenzer et al. | |
| 5,175,962 | A | * | 1/1993 | Pedersen | ............... 451/5 |

(Continued)

FOREIGN PATENT DOCUMENTS

CN  87106651 A  4/1988
(Continued)

OTHER PUBLICATIONS

Klingelnberg-Oerlikon brochure "SIGMA OPAL, Formschleifen von Großverzahnungen", pp. 1-20.

(Continued)

*Primary Examiner* — Charles R Kasenge
(74) *Attorney, Agent, or Firm* — McCormick, Paulding & Huber LLP (57) ABSTRACT

Neutral data computer control system for a multiaxis machine tool for producing workpieces having a helicoidal generated surface with an optional computer system (1) for generating machine control parameters for a multiaxis machine tool (2, 2a) in which there is provided at least one virtual axis, which can be parameterized as a guiding axis for other axes and then serves only for the synchronization of these other axes, and with at least one data processing unit and at least one memory, the data processing unit being set up in programming terms in such a way that it generates at least one data carrier or an electronic carrier signal (3) with machine control parameters for the machine (2, 2a), or an optional computer program or a computer program product for this and at least one such multiaxis machine tool (2, 2a).

35 Claims, 3 Drawing Sheets

U.S. PATENT DOCUMENTS

| | | | |
|---|---|---|---|
| 5,573,449 | A | 11/1996 | Mackowsky |
| 5,604,677 | A | 2/1997 | Brien |
| 5,715,429 | A * | 2/1998 | Takizawa et al. ............. 700/182 |
| 5,844,191 | A | 12/1998 | Cox |
| 5,859,515 | A * | 1/1999 | Takizawa et al. ............. 318/560 |
| 5,868,051 | A | 2/1999 | Pakos |
| 5,911,924 | A * | 6/1999 | Siegrist et al. ................ 700/200 |
| 5,930,142 | A | 7/1999 | Schleicher et al. |
| 6,217,409 | B1 | 4/2001 | Stadtfeld et al. |
| 6,249,102 | B1 | 6/2001 | Brakelmann et al. |
| 6,489,741 | B1 | 12/2002 | Genov et al. |
| 6,671,569 | B1 | 12/2003 | Schoop et al. |
| 6,687,566 | B2 | 2/2004 | Nishimoto et al. |
| 6,704,872 | B1 | 3/2004 | Okada |
| 6,755,748 | B2 | 6/2004 | Brooks |
| 6,858,814 | B2 * | 2/2005 | Fischer et al. ........... 219/121.67 |
| 6,868,304 | B2 | 3/2005 | Uehara et al. |
| 6,985,793 | B2 | 1/2006 | Landers et al. |
| 7,003,373 | B2 * | 2/2006 | Baumann et al. ............. 700/169 |
| 7,012,395 | B2 * | 3/2006 | Haunerdinger et al. ...... 318/573 |
| 7,030,586 | B2 | 4/2006 | Cazzavillan et al. |
| 7,643,639 | B2 | 1/2010 | Kaszkin et al. |
| 2001/0020228 | A1 | 9/2001 | Cantu et al. |
| 2002/0023223 | A1 | 2/2002 | Schmidt et al. |
| 2003/0163431 | A1 | 8/2003 | Ginter et al. |
| 2004/0164698 | A1 | 8/2004 | Cazzavillan et al. |

FOREIGN PATENT DOCUMENTS

| | | |
|---|---|---|
| DE | 43 42 648 A1 | 6/1995 |
| DE | 195 45 083 A1 | 6/1997 |
| DE | 69227215 T2 | 6/1999 |
| DE | 197 81 968 T1 | 11/1999 |
| DE | 19935320 A1 | 2/2001 |
| DE | 10125383 A1 | 6/2002 |
| DE | 10124800 A1 | 12/2002 |
| EP | 0067875 A1 | 12/1982 |
| EP | 0261947 A1 | 3/1988 |
| EP | 0522590 A1 | 1/1993 |
| EP | 0 709 157 A2 | 5/1996 |
| EP | 0 784 525 B1 | 5/2002 |
| JP | 57111792 A | 7/1982 |
| JP | 62150438 A | 7/1987 |
| JP | 07129207 A | 5/1995 |
| JP | 11345117 A | 12/1999 |
| JP | 2000076063 A | 3/2000 |
| JP | 2001255953 A | 9/2001 |
| JP | 2003015713 A | 1/2003 |
| JP | 2003044109 A | 2/2003 |
| WO | WO 98/09203 | 3/1998 |
| WO | 02063824 A1 | 8/2002 |
| WO | 02095506 A2 | 11/2002 |
| WO | 03005135 A2 | 1/2003 |

OTHER PUBLICATIONS

Klingelnberg brochure "SNC 31, Werkzeug-Scharfschleifmaschine", pp. 1-20.

Klingelnberg brochure "HNC 35, Vollautomatische Schnecken-und Gewindeschleifmaschine", pp. 1-14.

Presentation of Dr. Harmuth Müller of Klingelnberg Söhne/Oerlikon Geartec, "EMO", Sep. 2001, Hannover, Germany.

Presentation of Dr. Roland Dutschk of Klingelnberg Söhne/Oerlikon Geartec Design and Optimization of Spiral Bevel Gears, Apr. 2001.

Masahiro Kawamitsu, Total Security Solution, Business Communication, vol. 36, No. 8, Japan, Aug. 1, 1999, pp. 104-105.

Wahl, Heiko, "Schneller Datenaustausch übers Netz", MaschinenMarkt, No. 25, Jun. 2003, 38-40.

Bauer, Friedrich L., "Entzifferte Geheimnisse—Methoden und Maximen der Kryptologie" Berlin Heidelberg 1995, 153-168.

Diffie, Whitfield and Hellman, Martin E., "New Directions in Cryptography", IEEE Transactions on Information Theory, vol. IT-22, No. 6, 644-654.

Cranor, Lorrie Faith and Cytron, Ron K., "Sensus: A Security-Conscious Electronic Polling System for the Internet", vol. 3, 561-570.

Halsall, Fred, "Data Communications, Computer Networks, and Open Systems" 3rd Ed., 1992, 598-599.

* cited by examiner

NEUTRAL DATA COMPUTER CONTROL SYSTEM FOR A MACHINE TOOL USED TO PRODUCE WORKPIECES WITH A THREADED SURFACE AND ASSOCIATED MACHINE TOOL

CROSS REFERENCE TO RELATED APPLICATIONS

This application claims the benefit of PCT Application No. PCT/EP2003/011568, filed on Oct. 17, 2003, the disclosures of which are herein incorporated by reference in their entirety.

FIELD OF THE INVENTION

The present invention relates to a neutral data computer control system for a machine tool with a computer system, a computer program and computer program products, and also an associated machine tool.

BACKGROUND OF THE INVENTION

Against the background of increasingly interlinked production processes and their standardization in the industry, the problem that is nowadays the prime concern in the production of machine tools is that of also incorporating in this process the computer systems that are necessary for activating the machine tools. In this respect, one aim is to provide, to the extent technically possible, standardized machine control systems, offering the user greatest possible uniformity of the machine control parameters for the products from his range of workpieces—for instance when changing an actual machine type or else for improved data storage and archiving.

Such initiatives have already been pursued for some time for various types of machine tool, including for instance for bevel gear cutting machines, which are the focus of attention here.

For bevel gear cutting machines there are for instance solutions to this in which the relevant machine control parameters of an entire machine family are combined in a standardized data model with all the axes to be activated that come into consideration in the machine family, which then, in individual cases, is replicated on the respective machine actually concerned—to the extent to which this is possible—that is to say the axes activated by the machine control parameters are also actually present.

For gear cutting machines for the form milling or grinding of workpieces having a helicoidal generated surface, that is to say in particular spur gears, worms and rotors, such a system does not exist as yet—although it would of course also be desirable here for the reasons stated above.

The reason for this lies in a particular technical difficulty that has to be overcome in the form grinding of these workpieces: multiaxis positioning systems, as are also required by machine tools, need synchronization of the individual movements with one another, so that a defined curve is followed in three-dimensional space. This is achieved by one of the axes serving not only for its own positioning but also as a guiding axis for the synchronization of the other axes to be positioned.

Such a method according to the prior art can be found for instance in EP 0 784 525, which relates to a method of producing tooth flank modifications on bevel gears. The relevant axes are activated preferably by means of a polynomial function of the form $$f(\Theta) = a_0 + \frac{a_1}{1!}\Delta\Theta + \frac{a_2}{2!}\Delta\Theta^2 + \frac{a_3}{3!}\cdot\Delta\Theta^3 + \frac{a_3}{4!}\cdot\Delta\Theta^4$$

where $f(\theta)$ is the positioning function for the respective axis to be activated in dependence on the movement of the guiding axis $\theta$. The coefficients $a_0$, $a_1$, $a_2$, $a_3$ and $a_4$ serve in this case as further parameters of the position control of the respective axis activated by the function $f(\theta)$.

According to the prior art, one of the mechanical axes of the machine tool to be activated always serves in this case as the guiding axis. In the case of bevel gear cutting machines, which operate by the generating method and therefore have a cradle, as also in the case of EP 0 784 525, usually this cradle, which is always necessary, is used as the guiding axis; consequently, its generating movement is used as a guiding movement for the synchronization of the movements of the other axes. In this way there always exists—even irrespective of the further actual configuration of the respective machine type—a machine axis which, as a result of the generating process, can be used in a standard way as a guiding axis.

For form grinding machines on the other hand, which have no cradle or comparable axis, the problem of suitably choosing such a standardized guiding axis, or the question of possibly doing without it, immediately arises when attempting to standardize the machine control parameters for different machine types.

It is of course also possible here in principle to do without such a standard guiding axis and instead to specify the axis respectively used in the individual case as the guiding axis in the machine control parameters. Creating such a possibility can already lead to a certain standardization of the machine control parameters. Nevertheless, this is unsatisfactory, since, when changing a machine type to a machine which does not have the selected guiding axis, there is not only the problem of creating new machine control parameters for the guiding axis but also, on account of the dependencies described above of the other axes on the guiding axis, always the immediate requirement of generating new machine control parameters for all the other axes that are dependent on the guiding axis. If, on the other hand, there is no other axis present as the guiding axis, it can be attempted to achieve its positioning result on the workpiece by other further axes that are instead present on the new machine type being activated by machine control parameters in a corresponding way, the other axes with their respective machine control parameters remaining unaffected.

Thus, for instance, an absent positionable pivoting axis for the pivoting of the workpiece and tool with respect to each other by means of a rotation of the tool axis in the vertical can be replaced by a pivoting axis for the pivoting of the workpiece and the tool with respect to each other by means of a rotation of the workpiece axis in the horizontal, without the machine control parameters for instance of a radial infeed axis or a positionable rotating axis of a clamping head for the rotation of the workpiece in the workpiece holder being affected.

A precondition for this, however, is that a guiding axis that is standard for the entire control concept of all machine types coming into consideration can be specified. This condition is not met in the case of form grinding machines, as already stated above, if only because here—by contrast with machines which operate on the basis of a generating method—there is no generating movement that is always necessary and always able to serve as a guiding movement.

SUMMARY OF THE INVENTION

It is therefore the object of the present invention to provide a computer control system for a machine tool for producing workpieces having a helicoidal generated surface which allows the use of the respective machine control parameters for different machine types with different activatable axes in such a way that, when changing the machine to be activated, as few machine control parameters as possible—within the limits of geometrical possibility—have to be newly formed for activating the axes.

This is achieved by a multiaxis machine tool for producing workpieces with a helicoidal generated surface which has a workpiece holder for receiving a workpiece, a tool, activatable mechanical axes for machining the workpiece or for positioning the workpiece and the tool in relation to each other, and also an open-loop and/or closed-loop control device for activating axes, and which is characterized according to the invention in that there is provided at least one virtual axis, which can be parameterized as a guiding axis for other axes and then serves only for the synchronization of these other axes.

In this way there is created an additional virtual axis, which itself does not activate any mechanical axis of the machine tool, but nevertheless is able to synchronize other axes. This can take place for instance by an only time-dependent polynomial, as follows $$L_{Virt}(t) = a_{virt,0} + a_{virt,1} \cdot t + a_{virt,2} \cdot t^2 + a_{virt,3} \cdot t^3$$

to be precise without the thereby determined value $L_{Virt}(t)$ being used for the direct activation of a mechanical axis of the machine tool. Rather, this is included somewhat as follows $$\text{Achspos}_1(L_{Virt}(t)) = a_{1,0} + a_{1,1} \cdot L_{Virt}(t) + a_{1,2} \cdot L_{Virt}(t)^2 + a_{1,3} \cdot L_{Virt}(t)^3$$

$$\text{Achspos}_2(L_{Virt}(t)) = a_{2,0} + a_{2,1} \cdot L_{Virt}(t) + a_{2,2} \cdot L_{Virt}(t)^2 + a_{2,3} \cdot L_{Virt}(t)^3$$

$$\text{Achspos}_3(L_{Virt}(t)) = a_{3,0} + a_{3,1} \cdot L_{Virt}(t) + a_{3,2} \cdot L_{Virt}(t)^2 + a_{3,3} \cdot L_{Virt}(t)^3$$

with a synchronizing effect in the formation of the position values actually used for the activation of the mechanical axes, $\text{Achspos}_i$ (here 3 axes, that is to say i=1 to 3).

The provision of such a virtual axis consequently allows the formation of the axial positions for the activation of the mechanical axes to be kept completely independent of any actual movement of each axis of the machine tool, whereby it is therefore possible when changing the machine to be activated—within the limits of geometrical possibility—newly to form only the machine control parameters which serve for the activation of axes that are additionally present in the new machine. On the other hand, the machine control parameters for axes that are to be encountered before and after the change of the machine are retained. In the case of the aforementioned polynomials, this means for instance that the coefficients $a_{i,j}$ defining the path curve do not have to be newly formed for these axes.

With respect to the term used here, the virtual axis, it should be noted with regard to the use of this term in the prior art that this is standard terminology to the extent that it concerns an axis formed only in the respective open-loop and/or closed-loop control device that is used, having no direct equivalent in the mechanical axes of the respective machine tool that are actually present. Differences from the prior art, for instance according to DE 42 91 619 C1, exist here however to the extent that the virtual axis there (sometimes also referred to there as the soft axis) serves for the direct activation of actual mechanical axes, from which the virtual axis there is combined to a certain extent on a software basis. By contrast, the virtual axis in the sense of the present invention here does not serve for any actual activation of mechanical axes, in particular not for any software synthesis of additional axes finding an equivalent in the mechanical reality of the machine tool to be activated, but only for the synchronization of the activation of other axes.

Accordingly, the success according to the invention is also achieved by a method of activating a multiaxis machine tool according to the invention, a virtual axis initially being parameterized as a guiding axis for other axes, and then, during the operation of the machine for machining the workpiece, the other axes merely being synchronized in their positioning with the aid of this virtual guiding axis.

The multiaxis machine tool according to the invention preferably has at least five activatable mechanical axes for the positioning of the workpiece and the tool in relation to each other, which permits the fabrication of rotationally symmetrical workpieces. If it is also desired to fabricate non-rotationally symmetrical workpieces, such as worms for instance, at least one additional axis is needed, provided for the pivoting of the workpiece and the grinding wheel with respect to each other in the horizontal, as still to be explained.

In a particularly preferred way, the multiaxis machine tool according to the present invention is characterized in that a grinding wheel is provided as the tool and, as mechanical axes, at least one

- positionable radial infeed axis, also designated by $\chi$, is provided for the grinding wheel,
- a grinding slide which can be positioned horizontally and orthogonally in relation to the radial infeed axis, also designated by $\zeta$, is provided for the positioning of the grinding wheel in the direction of displacement of the grinding slide,
- a positionable rotating axis, also designated by $\beta$, of a clamping head is provided for the rotation of the workpiece in the workpiece holder,
- a positionable pivoting axis, also designated by $\tau$, is provided for the pivoting of the workpiece and the grinding wheel with respect to each other by means of a rotation of the grinding wheel axis or its parallel projection in the vertical plane, also designated by B, and
- a rotating axis, also designated by $\omega$, is provided for the driving of the grinding wheel.

A positionable displacing axis, also designated by $\delta$, for the monitoring of a displacing position of the grinding wheel along the grinding wheel axis, may also be provided as a mechanical axis.

The multiaxis machine tool according to the invention preferably also has a pivoting axis, also designated by $\sigma$, as a mechanical axis for the pivoting of the workpiece and the grinding wheel with respect to each other by means of a rotation of the grinding wheel axis or its parallel projection in the horizontal plane, also designated by A, which also allows the already mentioned fabrication of non-rotationally symmetrical workpieces.

As an alternative or in addition, this may also be achieved by a mechanical pivoting axis, also designated by, for the pivoting of the workpiece and the grinding wheel with respect to each other by means of a rotation of the workpiece axis or its parallel projection in the horizontal plane, also designated by A.

Furthermore, a displacing axis, also designated by, may be provided as a mechanical axis, serving for the vertical displacement of the workpiece and the grinding wheel with respect to each other.

The virtual axis itself is formed particularly preferably by the open-loop and/or closed-loop control device by means of a freely selectable function or relation, which is dependent in a particularly preferred way on time and in one embodiment of the present invention only on time. However, it is equally possible to make the virtual axis not dependent on time but on other events or values—possibly also external events or values—for instance positions reached by external machines, such as robots.

The embodiment of the present invention which forms the virtual axis by means of a freely selectable function or relation also has some special advantages:

During the grinding of workpieces having a helicoidal generated surface, such as for instance spur gears (of a helicoidal surface which sometimes also has a zero pitch of the thread, namely in the case of straight teeth), worms or rotors, it is frequently the case that a single non-virtual guiding axis is often not adequate here for the entire workpiece fabrication process, since its guiding movement often becomes too minimal, in view of the limited numerical accuracy in reality, to allow activating functions (or relations) with sufficient movement still to be calculated for the other axes in dependence on it. This becomes particularly clear for instance for the case where a grinding slide which can be positioned horizontally and orthogonally in relation to a radial infeed axis is used for instance as a guiding axis for the positioning of the grinding wheel in the displacing direction of the grinding slide, and then an edge running orthogonally in relation to the workpiece rotating axis is to be milled on the workpiece, for instance as a termination of a helicoidal generated surface, as occurs for instance in the case of workpieces which have a number of helicoidal surfaces that are separated from one another, for instance by round axial portions, or are at least different in terms of their geometry. (In this connection it should be stated that workpieces with such partial or portional helicoidal surfaces are regarded as workpieces having a helicoidal generated surface in the sense of the present invention.) In the aforementioned case this is so because the movement of the grinding slide comes completely to a standstill at the point of the perpendicular to the workpiece axis, and consequently can no longer serve as a guiding movement even without limited numerical resolution; the grinding slide is consequently unusable as a guiding axis at this point. It is therefore necessary to carry out a change of the guiding axis at such points, which makes standardized machine control parameters for different machine models all the more difficult, since then, in the case of a change of machine type, the difficulties already mentioned at the beginning of adaptation to the new machine sometimes occur for each guiding axis used. Moreover, it should be noted that such a change of axis also always leads to undesired fabrication marks on the workpiece to be created at the point of the workpiece where the change is performed, on account of the associated discontinuity of the activation of the axes.

While the virtual axis according to the present invention can be formed by means of a freely selectable function or relation, this can take place in such a way that this virtual guiding axis meets requirements throughout the entire fabrication process without changing the guiding axis, since in this way any dependence of the guiding axis caused by the fabrication process can be avoided on account of the complete freedom in its choice. In this way, the present invention is advantageously also suitable for the case of operating only a single machine type that comes into consideration, since in this case no problems of the type described at the beginning in respect of changing the guiding axis occur any longer when the freely selectable virtual axis according to the invention is used, and consequently no resultant defects occur any longer on the workpieces. If, on the other hand, the virtual guiding axis is chosen to be unchanging, process-related dependencies possibly cannot be ruled out, which may then lead to the already mentioned numerically unfavourably conditioned systems.

As already explained in the example given above, a polynomial function comes into consideration in particular as the freely selectable function, but so too does for example a circular relation. A freely selectable relation may also similarly be defined by a table of values.

The activation of the respective mechanical axis by the open-loop and/or closed-loop control device may also take place by means of a freely selectable function or relation, the respective mechanical axis preferably being dependent, as also already explained above, on the value of a virtually formed axis acting as a guiding axis, in order in this way to achieve the synchronization of the axial positions with respect to one another.

Of course, the respective axis may in this case also be made dependent on the value of further parameters, for instance for the activation of the desired positional values. As already explained, a polynomial function, which is also dependent on the value of one of the virtual axes and polynomial coefficients, may serve in this case as the freely selectable function.

However, similarly suitable as the freely selectable relation for the respective mechanical axis is a circular relation, which is dependent on the value of one of the virtual axes and circle constants, preferably a circle radius and a centre point, given by a pair of coordinates, and also a direction of rotation.

The same applies to the activation of the respective mechanical axis, which takes place by the open-loop and/or closed-loop control device by means of a freely selectable relation which is given by a table of coordinates, and similarly for all other functions and/or relations that appear to be suitable for achieving the desired workpiece geometry.

In the case of use of a relation formed by a table of coordinates, this is preferably formed by an X coordinate, a Y coordinate and a normal angle, preferably as viewed in end-on section.

In a further preferred embodiment according to the present invention, the multiaxis machine tool is characterized in that a memory is also provided, stored in which are machine control parameters which are accessed by the open-loop and/or closed-loop control device, which permits flexible realization of the present invention by a computer control system.

This is so because a data structure which allows the parameterization of the virtual axis as a guiding axis for other axes can be provided in this memory, it also being possible that here there is a data structure which also allows the parameterization of any mechanical axis as a guiding axis for other axes, for instance to allow older machine control parameters that are not yet adjusted to the computer control system according to the invention to be used.

The definition of the function or relation for the formation of the virtual axis and also the definition of the function or relation for the activation of the respective mechanical axis by the open-loop and/or closed-loop control device can also be flexibly stored in the memory.

In this case, data fields may serve for the identification of predefined types of function or types of relation, used for the definition of a function or relation of the respective mechanical axis. Such a predefinition of frequently used types of function and/or relation makes it easier here for the definition to be stored in the memory. Preferably coming into consideration as types of function predefined in such a way are for instance a polynomial function, for instance of the sixth degree, with polynomial coefficients as parameters, or else once again a circular relation with a circle radius and a centre point, given by a pair of coordinates, and a direction of rotation as parameters. Similarly, however, a table of coordinates with coordinates as parameters may be predefined as a type of relation, an X coordinate, a Y coordinate and a normal angle, preferably as viewed in end-on section, preferably being used in each case as coordinates.

In a further preferred embodiment of a multiaxis machine tool according to the present invention, in the memory in which the machine control parameters accessed by the open-loop and/or closed-loop control device are stored there is a data structure which is intended for receiving an identification of the workpiece flank being machined by the activation of the respective mechanical axis by the open-loop and/or closed-loop control device, preferably an identification for a flank on the right or on the left. This parameter is required by the machine in the case of non-symmetrically formed grinding wheels, such as for instance for the fabrication of worms, in order to move to the respective flank with the correct side of the tool. This control parameter also permits open-loop or closed-loop control of the force in a way corresponding to the respective flank.

In the memory in which machine control parameters accessed by the open-loop and/or closed-loop control device are stored there is also a data structure which combines at least one group of machine control parameters corresponding to a partial region of the workpiece, as a segment under a common segment identification, preferably a segment number, it being preferred that such a group of machine control parameters for which the same axis is parameterized as the guiding axis are always combined as a segment.

The structuring of the machine control parameters into segments makes it possible to replicate a segmentation of the workpiece that exists in reality also in the structuring of the machine control parameters, which improves their overall clarity and consequently also the possibility of their assignment to the first cuts made on workpieces.

The embodiments described above of a multiaxis machine tool according to the invention with a memory consequently serve for the replication in this memory of machine control parameters which initiate during the operation of the machine functions for workpiece fabrication. However, this can take place not only by storage in the memory of the machine, but also by reading in a data carrier provided with corresponding machine control parameters, such as for instance a floppy disc, a CD or else a DVD, or else by reading an electronic carrier signal with these machine control parameters into the multiaxis machine tool according to the invention, for instance via a data line, as preferably also used in a data network. Such a data carrier or such a data carrier signal is in this case constructed in a way corresponding to the present invention for reading the data constructed according to the invention as described above into the multiaxis machine tool according to the invention for controlling the latter in a way corresponding to the present invention.

In every case, such a data carrier or such an electronic carrier signal is parameterized according to the invention with machine control parameters for reading into a multiaxis machine tool, the data carrier or the electronic carrier signal having on it at least one data structure which has a data field which allows the parameterization of the virtual axis as a guiding axis for other axes, and the data carrier or the electronic carrier signal activating the machine tool during the reading-in or after the reading-in by means of this data structure on the basis of the method according to the invention stated above.

Also serving for carrying out the present invention is a method of generating machine control parameters for a multiaxis machine tool which is characterized according to the invention in that it generates a data carrier or an electronic carrier signal with machine control parameters as described above. It goes without saying that this method may also be realized on a computer system with at least one data processing unit and at least one memory, usually for instance as a computer program, it having the corresponding instructions set up for carrying out the method. Such a computer program may in this case take any form, but in particular also that of a computer program product on a computer-readable medium, such as for instance a floppy disc, CD or DVD, it having computer program coding means, with which, after loading the computer program, a computer is in each case made by the program to carry out the method according to the invention. It may, however, also be for instance in the form of a computer program product which has a computer program on an electronic carrier signal, with which, after loading the computer program, a computer is in each case made by the program to carry out the method according to the invention.

The different individual elements of the present invention described above, seen in their entirety, can provide a neutral data computer control system for a multiaxis machine tool for producing workpieces having a helicoidal generated surface with a computer system according to the invention for generating machine control parameters for a multiaxis machine tool with at least one data processing unit and at least one memory, the data processing unit being set up in programming terms in such a way that it generates at least one data carrier or an electronic carrier signal with machine control parameters according to the present invention, or such a computer program or computer program product, and at least one multiaxis machine tool according to the invention.

Further details of such a system according to the present invention can be taken from the exemplary embodiments.

BRIEF DESCRIPTION OF THE DRAWINGS

Exemplary embodiments of the present invention, which are to be understood as non-restrictive, are discussed below on the basis of the drawing, in which.

DESCRIPTION OF PREFERRED EMBODIMENTS

Figure 1:
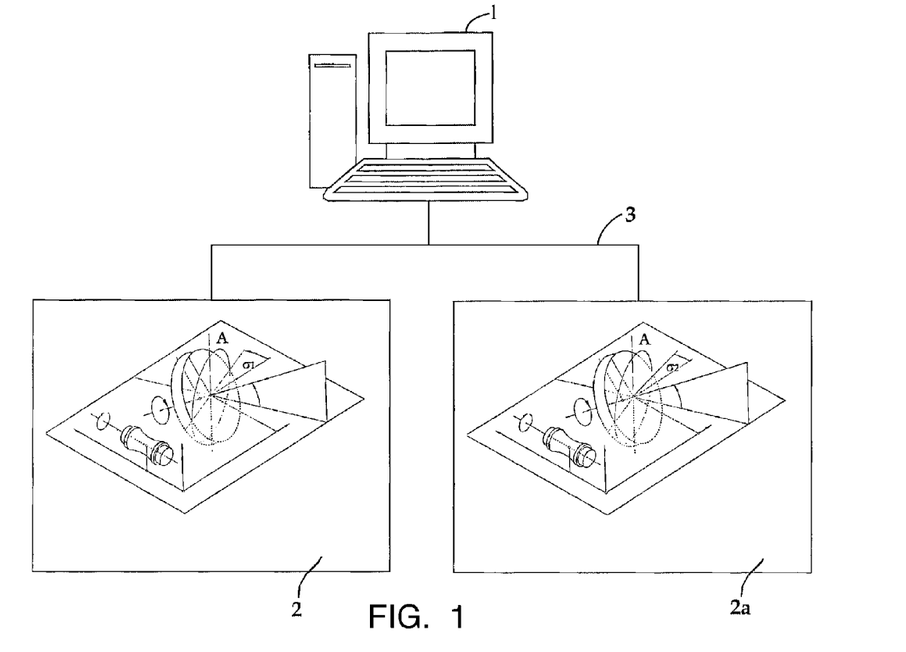
FIG. 1 shows a neutral data computer control system according to the invention for a multiaxis machine tool for producing workpieces having a helicoidal generated surface.

FIG. 1 shows a neutral data computer control system according to the invention for a multiaxis machine tool for producing workpieces having a helicoidal generated surface, to be precise with
   a computer system 1 according to the invention for generating machine control parameters for a multiaxis machine tool 2, 2a with at least one data processing unit and at least one memory, the data processing unit being set up in programming terms in such a way that it generates here in a data network an electronic carrier signal 3 with machine control parameters according to the present invention,
   and a first multiaxis machine tool 2 according to the invention and a second such machine tool 2a.

In the present case, the situation is therefore such that the first machine 2 has (along with other axes) a mechanical pivoting axis σ for the pivoting of the workpiece and the grinding wheel with respect to each other by means of a rotation of the grinding wheel axis or its parallel projection in the horizontal plane A; a possibility which the second machine 2a does not have. However, the latter does have a pivoting axis γ for the pivoting of the workpiece and the grinding wheel with respect to each other by means of a rotation of the workpiece axis or its parallel projection in the horizontal plane A. In the present neutral data computer system, it is thus easily possible to use machine control parameters generated by the computer system 1 for the first machine 2 according to the invention also for the second machine tool 2a according to the invention if the generated machine control parameters make use of a virtual guiding axis according to the present invention. Both machines 2, 2a have a virtual guiding axis, so that, when there is a change of machine from the first machine 2 to the second machine 2a, only the machine control parameters for the pivoting axis γ instead of the pivoting axis σ have to be formed. All the other machine control parameters, on the other hand, can be retained, since they are coupled by the virtual guiding axis.

Figure 2:
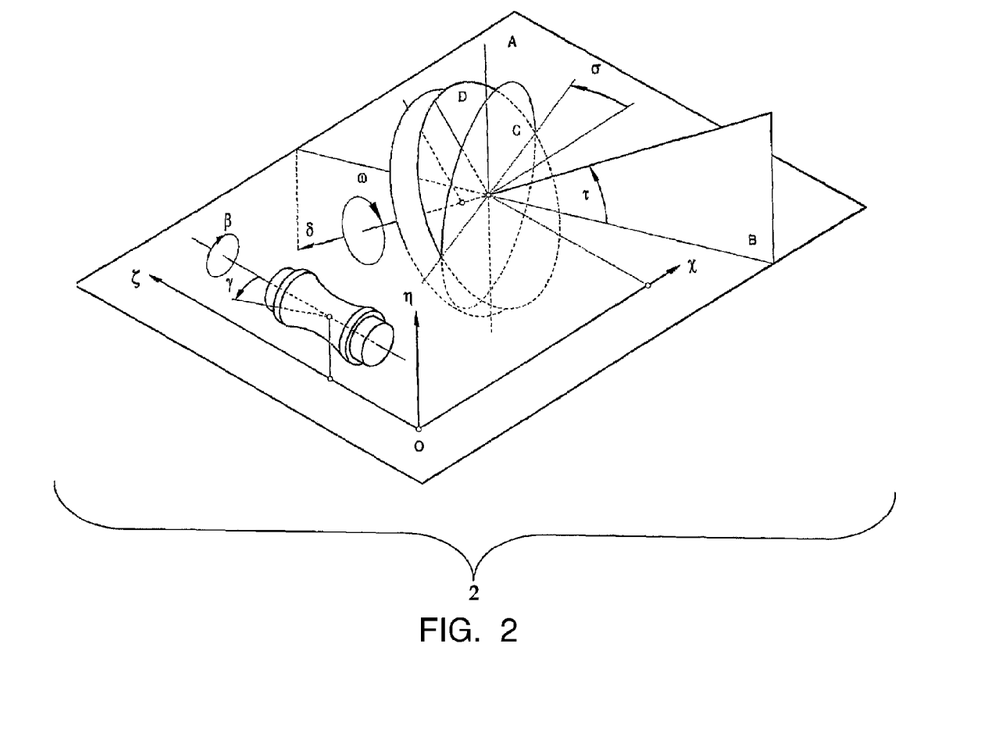
FIG. 2 shows an abstract model of a multiaxis machine tool according to the invention for producing workpieces having a helicoidal generated surface with diverse mechanical axes.

FIG. 2 shows an abstract model (covering various actual configurational possibilities) of a multiaxis machine tool according to the invention for producing workpieces having a helicoidal generated surface with diverse mechanical axes, to be precise with
   a positionable radial infeed axis χ for the grinding wheel,
   a grinding slide ζ which can be positioned horizontally and orthogonally in relation to the radial infeed axis, for the positioning of the grinding wheel in the direction of displacement of the grinding slide,
   a positionable rotating axis β of a clamping head for the rotation of the workpiece in the workpiece holder,
   a positionable pivoting axis τ for the pivoting of the workpiece and the grinding wheel with respect to each other by means of a rotation of the grinding wheel axis or its parallel projection in the vertical plane B,
   a rotating axis ω for the driving of the grinding wheel,
   a positionable displacing axis δ for the monitoring of a displacing position of the grinding wheel along the grinding wheel axis,
   a pivoting axis σ for the pivoting of the workpiece and the grinding wheel with respect to each other by means of a rotation of the grinding wheel axis or its parallel projection in the horizontal plane A,
   a displacing axis η for the vertical displacement of the workpiece and the grinding wheel with respect to each other, and
   a pivoting axis γ for the pivoting of the workpiece and the grinding wheel with respect to each other by means of a rotation of the workpiece axis or its parallel projection in the horizontal plane A for better illustration of the geometrical relationships taken as a reference.

Figure 3:
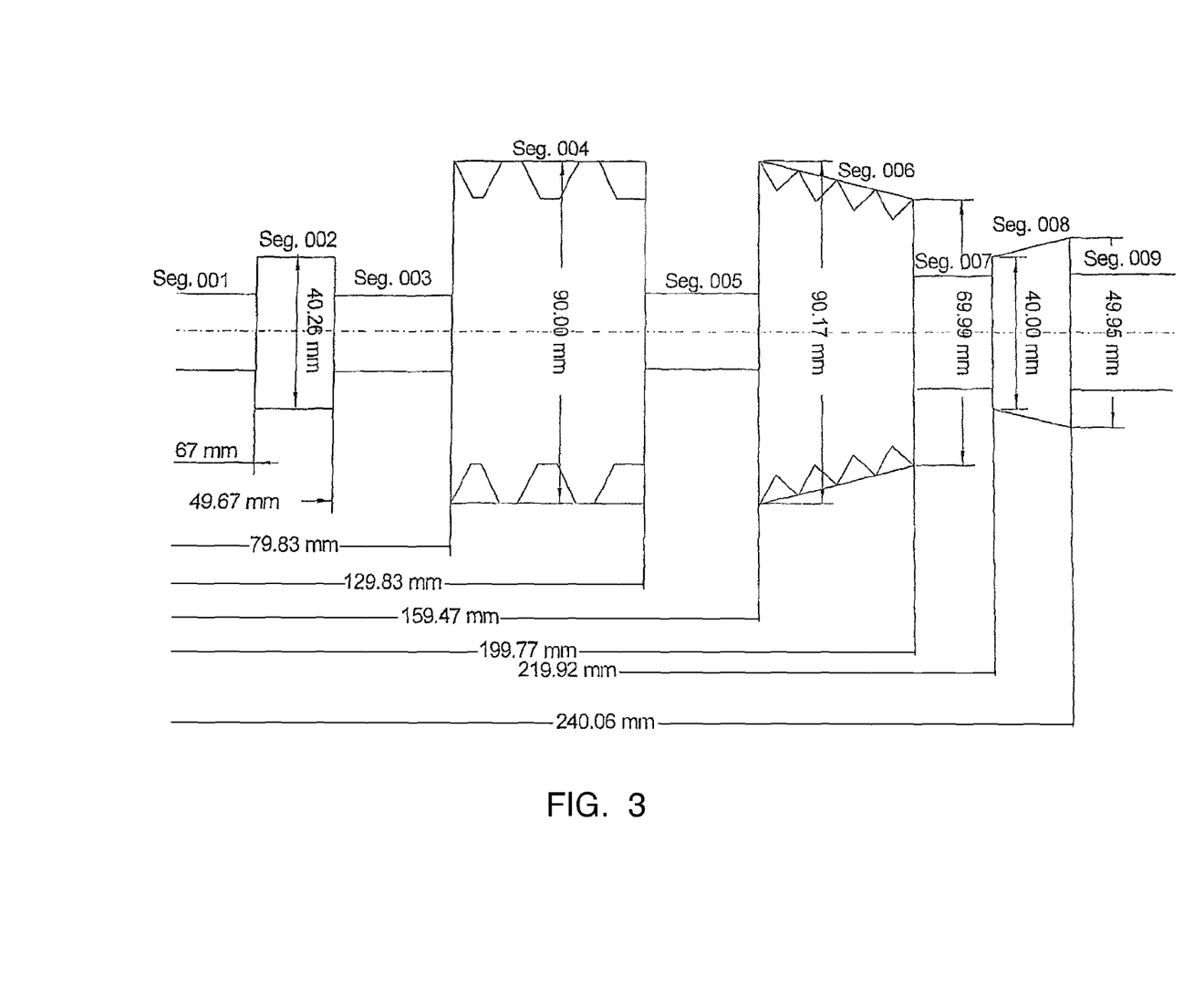
FIG. 3 shows a workpiece having a helicoidal generated surface for being produced on a multiaxis machine tool according to the invention.

FIG. 3 shows a workpiece having a helicoidal generated surface for being produced on a multiaxis machine tool according to the invention, with 9 different segments. With reference to the abstract model illustrated in FIG. 2, the machine control parameters are to be specified below in a way corresponding to the present invention by way of example for the segment 8, a conical kneading element Seg. 8, the virtual guiding axis being designated here by κ:

TABLE 1

Segment 008: 2nd conical kneading element
Process: roughing

| | Guiding axis: κ | $X_{Start}$ | $X_{End}$ | A | B | C | D | E | F | G |
|---|---|---|---|---|---|---|---|---|---|---|
| κ | [ ] | 008 = PB | 0 | 1 | 0 | 1 | 0 | 0 | 0 | 0 | 0 |
| η | [mm] | 008 = PB | 0 | 1 | 0 | 0 | 0 | 0 | 0 | 0 | 0 |
| γ | [rad] | 008 = PB | 0 | 1 | 0 | 0 | 0 | 0 | 0 | 0 | 0 |
| ω | [m/s] | 008 = PB | 0 | 1 | 40.0 | 0 | 0 | 0 | 0 | 0 | 0 |
| τ | [rad] | 008 = PB | 0 | 1 | 0.00706 | 0.000027 | 0 | 0 | 0 | 0 | 0 |
| δ | [mm] | 008 = PB | 0 | 1 | 0.0 | 0 | 0 | 0 | 0 | 0 | 0 |
| σ | [rad] | 008 = PB | 0 | 1 | 0 | 0 | 0 | 0 | 0 | 0 | 0 |
| ζ | [mm] | 008 = PB | 0 | 1 | 0 | 0.3183 | 0 | 0 | 0 | 0 | 0 |
| β | [rad] | 008 = PB | 0 | 1 | 0 | 0.00395 | 0 | 0 | 0 | 0 | 0 |
| χ | [mm] | 008 = PB | 0 | 1 | 90.17 | −0.0797 | 0 | 0 | 0 | 0 | 0 |

Figure 4:
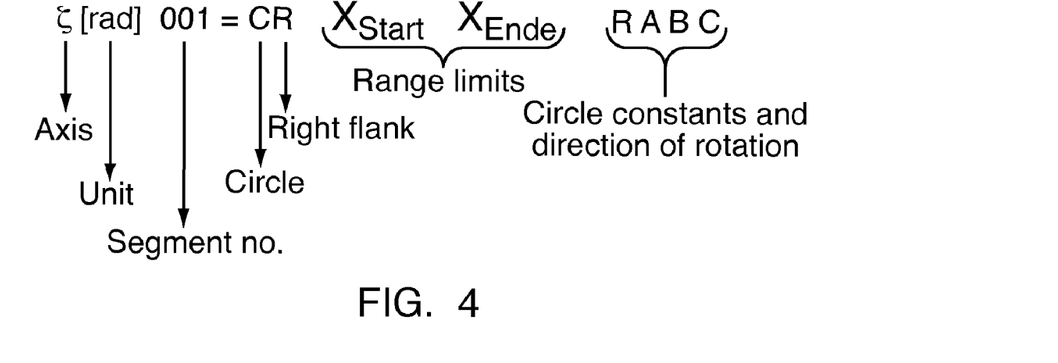
FIGS. 4 and 5 show exemplary machine control parameters used by the neutral data computer system of FIG. 1.
Figure 5:
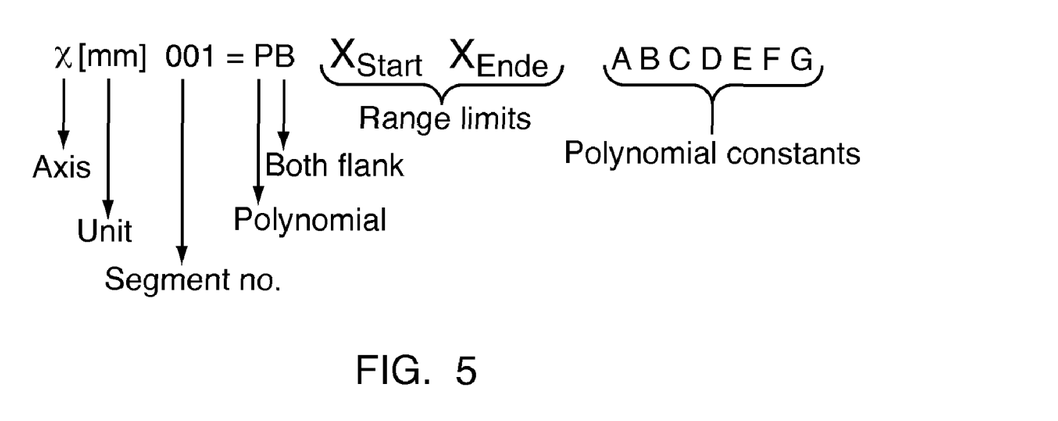

To explain such a table (not all the options are used above in Table 1), which reproduces an embodiment of the functional data structures according to the present invention:
Column 1: Designation of axis
Column 2: Unit
Column 3: Segment number=code letter for the type of neutral data (to be precise C for circle, P for polynomial [of the 6th degree], K for coordinates [points] of a table of coordinates) and code letter for which flank (R for right flank; L for left flank; B for both flanks)
Other columns: Table values with Xstart and XEnd as range limits and the values for parameters A, B, C, D, E, F and G (in the case of a polynomial), R, A, B, C (in the case of a circle) and A, B, C (in the case of a table of coordinates) with respect to the relations and functions on the basis of the following:
Circle [C as code letter]: $R=\sqrt{(x-A)^2+(y-B)^2}$
with the value in column R as radius, C as direction of rotation, with −1 indicating the clockwise direction of rotation (cw) and the value +1 indicating the counterclockwise direction of rotation (ccw)
polynomial [P as code letter]: $Y=A+B \cdot x+C \cdot x^2+D \cdot x^3+E \cdot x^4+F \cdot x^5+G \cdot x^6$
coordinates (points) of a table of coordinates [K as code letter]:

value in column A: X coordinate, value in column B: Y coordinate, value in column C: normal angle, always stored in end-on section For example, a circular machining operation on the right flank of the workpiece can be described using the parameters shown in FIG. 4. Similarly, a machining operation along a polynomial curve on both flanks can be described using the parameters shown in FIG. 5.

The invention claimed is:

1. A multiaxis machine tool for producing workpieces having a helicoidal generated surface, comprising:
   a workpiece holder for receiving a workpiece;
   a tool;
   at least five activatable mechanical axes for machining the workpiece or for positioning the workpiece and the tool in relation to each other; and
   a control device for activating the mechanical axes,
   wherein there is provided at least one virtual axis, which can be parameterized as a guiding axis for other axes and then serves only for the synchronization of these other axes
   wherein a grinding wheel is provided as the tool and, as mechanical axes, at least one positionable radial infeed axis ($\chi$) is provided for the grinding wheel,
   a grinding slide ($\zeta$) which can be positioned horizontally and orthogonally in relation to the radial infeed axis is provided for the positioning of the grinding wheel in the direction of displacement of the grinding slide,
   a positionable rotating axis ($\beta$) of a clamping head is provided for the rotation of the workpiece in the workpiece holder,
   a positionable pivoting axis ($\tau$) is provided for the pivoting of the workpiece and the grinding wheel with respect to each other by means of a rotation of the grinding wheel axis or its parallel projection in a vertical plane (B),
   and a rotating axis ($\omega$) is provided for the driving of the grinding wheel.

2. The multiaxis machine tool according to claim 1, wherein a positionable displacing axis ($\delta$) for the monitoring of a displacing position of the grinding wheel along the grinding wheel axis is also provided as a mechanical axis.

3. The multiaxis machine tool as claimed in claim 1, wherein a pivoting axis ($\sigma$) for the pivoting of the workpiece and the grinding wheel with respect to each other by means of a rotation of the grinding wheel axis or its parallel projection in a horizontal plane (A) is also provided as a mechanical axis.

4. The multiaxis machine tool according to claim 1, wherein a displacing axis ($\eta$) for the vertical displacement of the workpiece and the grinding wheel with respect to each other is also provided as a mechanical axis.

5. The multiaxis machine tool according to claim 1, wherein a pivoting axis ($\gamma$) for the pivoting of the workpiece and the grinding wheel with respect to each other by means of a rotation of the workpiece axis or its parallel projection in a horizontal plane (A) is also provided as a mechanical axis.

6. The multiaxis machine tool according to claim 1, wherein the virtual axis is formed by the control device by means of a freely selectable function or relation.

7. The multiaxis machine tool according to claim 1, wherein the virtual axis is formed by the control device by means of a freely selectable function or relation dependent on time.

8. The multiaxis machine tool according to claim 6, wherein a polynomial function serves as one of the freely selectable function or relation.

9. The multiaxis machine tool according to claim 6, wherein a circular relation serves as one of the freely selectable function or relation.

10. The multiaxis machine tool according to claim 6, wherein a relation given by a table of values serves as the freely selectable relation.

11. The multiaxis machine tool according to claim 1, wherein the activation of the respective mechanical axis by the control device takes place by means of a freely selectable function or relation.

12. The multiaxis machine tool according to claim 1, wherein the activation of the respective mechanical axis by the control device takes place by means of a freely selectable function or relation which is dependent on one of the virtual axes.

13. The multiaxis machine tool according to claim 12, wherein the activation of the respective mechanical axis by the control device takes place by means of a freely selectable function or relation which is also dependent on further parameters.

14. The multiaxis machine tool according to claim 13, wherein a polynomial function which is dependent on one of the virtual axes and polynomial coefficients serves as one of the freely selectable function or relation.

15. The multiaxis machine tool according to claim 13, wherein a circular relation which is dependent on one of the virtual axes and circle constants including a circle radius and a centre point, given by a pair of coordinates, and a direction of rotation serves as one of the freely selectable function or relation.

16. The multiaxis machine tool according to claim 6, wherein the activation of the respective mechanical axis by the control device takes place by means of a freely selectable relation which is given by a table of coordinates.

17. The multiaxis machine tool according to claim 16, wherein an X coordinate, a Y coordinate and a normal angle, as viewed in end-on section, are used as coordinates of the table of coordinates.

18. The multiaxis machine tool according to claim 1, wherein a memory is also provided, stored in which are machine control parameters which are accessed by the control device.

19. The multiaxis machine tool according to claim 18, wherein the memory also stores a data structure which allows the parameterization of the virtual axis as a guiding axis for other axes.

20. The multiaxis machine tool according to claim 18, wherein the memory also stores a data structure which also allows the parameterization of any mechanical axis as a guiding axis for other axes.

21. The multiaxis machine tool according to claim 18, wherein in the memory in which machine control parameters accessed by the control device are stored there is a data structure which is intended for receiving a definition of a function or relation for the formation of the virtual axis by the control device.

22. The multiaxis machine tool according to claim 18, wherein in the memory in which machine control parameters accessed by the control device are stored there is a data structure which is intended for receiving a definition of a function or relation for the activation of the respective mechanical axis by the control device.

23. The multiaxis machine tool according to claim 22, wherein at least one predefined type of function or relation is provided and the data structure has at least one data field for the identification of the predefined type of function or relation, used for the definition of a function or relation of the respective mechanical axis.

24. The multiaxis machine tool according to claim 23, wherein one of the at least one predefined type of function or relation is a polynomal function with polynomial coefficients as parameters.

25. The multiaxis machine tool according to claim 22, wherein, in the memory in which machine control parameters accessed by the control device are stored, there is a data structure which is intended for receiving an identification of a flank of the workpiece being machined by the activation of the respective mechanical axis by the control device.

26. The multiaxis machine tool according to claim 22, characterized in that in the memory in which machine control parameters accessed by the control device are stored there is a data structure which combines at least one group of machine control parameters corresponding to a partial region of the workpiece, as a segment under a common segment identification.

27. The multiaxis machine tool according to claim 1, further having a memory and means for reading into the memory machine control parameters for the control device from a data carrier or electronic carrier signal, the data carrier or carrier signal having at least one data structure which has a data field which allows the parameterization of the virtual axis as a guiding axis for other axes, and the data carrier or carrier signal activating the machine tool during the reading-in or after the reading-in by means of this data structure.

28. The multiaxis machine tool according to claim 1, wherein the control device is an open-loop control device.

29. The multiaxis machine tool according to claim 1, wherein the control device is a closed-loop control device.

30. A multiaxis machine tool for producing workpieces having a helicoidal generated surface, comprising:
a workpiece holder for receiving a workpiece;
a tool;
at least five activatable mechanical axes for machining the workpiece or for positioning the workpiece and the tool in relation to each other;
a control device for activating the mechanical axes, wherein there is provided at least one virtual axis, which can be parameterized as a guiding axis for other axes and then serves only for the synchronization of these other axes; and
a memory, stored in which are machine control parameters which are accessed by the control device,
wherein in the memory in which machine control parameters accessed by the control device are stored there is a data structure which is intended for receiving a definition of a function or relation for the activation of the respective mechanical axis by the control device,
wherein at least one predefined type of function or relation is provided and the data structure has at least one data field for the identification of the predefined type of function or relation, used for the definition of a function or relation of the respective mechanical axis,
wherein one of the at least one predefined type of function or relation is a polynomial function with polynomial coefficients as parameters, and
wherein the polynomial function is of the sixth degree.

31. A multiaxis machine tool for producing workpieces having a helicoidal generated surface, comprising:
a workpiece holder for receiving a workpiece;
a tool;
at least five activatable mechanical axes for machining the workpiece or for positioning the workpiece and the tool in relation to each other;
a control device for activating the mechanical axes, wherein there is provided at least one virtual axis, which can be parameterized as a guiding axis for other axes and then serves only for the synchronization of these other axes; and
a memory, stored in which are machine control parameters which are accessed by the control device,
wherein in the memory in which machine control parameters accessed by the control device are stored there is a data structure which is intended for receiving a definition of at least one predefined type of relation for the activation of the respective mechanical axis by the control device,
wherein one of the at least one predefined type of relation is a circular relation with a circle radius and a centre point, given by a pair of coordinates, and a rotating direction as parameters.

32. A multiaxis machine tool for producing workpieces having a helicoidal generated surface, comprising:
a workpiece holder for receiving a workpiece;
a tool;
at least five activatable mechanical axes for machining the workpiece or for positioning the workpiece and the tool in relation to each other;
a control device for activating the mechanical axes, wherein there is provided at least one virtual axis, which can be parameterized as a guiding axis for other axes and then serves only for the synchronization of these other axes; and
a memory, stored in which are machine control parameters which are accessed by the control device,
wherein in the memory in which machine control parameters accessed by the control device are stored there is a data structure which is intended for receiving a definition of at least one predefined tune of function for the activation of the respective mechanical axis by the control device,
wherein one of the at least one predefined type of function is a table of coordinates with coordinates as parameters.

33. The multiaxis machine tool according to claim 32, wherein an X coordinate, a Y coordinate and a normal angle, as viewed in end-on section, are used in each case as coordinates.

34. A multiaxis machine tool for producing workpieces having a helicoidal generated surface, comprising:
a workpiece holder for receiving a workpiece;
a tool;
at least five activatable mechanical axes for machining the workpiece or for positioning the workpiece and the tool in relation to each other;
a control device for activating the mechanical axes, wherein there is provided at least one virtual axis, which can be parameterized as a guiding axis for other axes and then serves only for the synchronization of these other axes; and
a memory, stored in which are machine control parameters which are accessed by the control device,
wherein in the memory in which machine control parameters accessed by the control device are stored there is a data structure which is intended for receiving a definition of a function or relation for the activation of the respective mechanical axis by the control device, and there is a data structure which combines at least one group of machine control parameters corresponding to a partial region of the workpiece, as a segment under a common segment identification, wherein the common segment identification is a segment number.

35. The multiaxis machine tool according to claim 34, characterized in that such a group of machine control parameters for which the same axis is parameterized as the guiding axis are always combined as a segment.

* * * * *